United States Patent Office

2,972,503
Patented Feb. 21, 1961

2,972,503

METHOD FOR CONTROL OF OPERATION OF PNEUMATIC LIFT AND APPARATUS THEREFOR

William R. Brennan, Stamford, Conn., assignor to Socony Mobil Oil Company, Inc., a corporation of New York Filed Feb. 16, 1960, Ser. No. 8,957

2 Claims. (Cl. 302—53)

This application pertains to the pneumatic transfer of solid, particle-form material and is particularly directed to an improved apparatus for and method of controlling the operation of a pneumatic lift through which granular contact material is lifted in a continuous hydrocarbon conversion process.

In the petroleum industry many processes are known in which hydrocarbons, at temperature and pressure suitable for conversion, are contacted with a granular solid material in the form of a gravitating column to produce converted products. While gravitating through the conversion zone, the particles receive a deposit of carbonaceous material or "coke" on their surface. The particles are removed from the bottom of the column to a reconditioning zone where they are contacted with a combustion supporting gas at temperatures high enough to burn off the coke deposits. The reconditioned contact material is returned thereafter, to the top of the column in the conversion zone and reused. Gas lifts have recently been adopted in these processes for elevating the contact material in a rapidly flowing stream of lift gas in which the particles are carried in dispersed flow. The attrition or breakage of the particles in the lift varies with the gas flow through the lift and is minimum at that flow which yields minimum pressure drop across the lift. At gas flow rates above or below the flow rate yielding minimum presusre drop, the attrition or breakage of the particles increases sharply.

Examples of various processes in this industry which necessitates the use of granular contact material are polymerization, dehydrogenation, isomerization, alkylation, hydrogenation, reforming, cyclization, desulfurization and catalytic cracking. This invention will be described in relation to a catalytic cracking process, being understood, however, to apply broadly to any process or operation in which it is desired to lift a solid material in particle-form condition with minimum difficulty and inefficiency, particularly during the commencement or recommencement of flow of contact material through the lift. For example, this invention may be applied to conversion processes wherein hydrocarbons, prepared for conversion, are brought into contact with inert refractory particles and converted products are removed therefrom. Typical of such processes is the production of ethylene from various gas oils at temperatures in the neighborhood of 1500° F.

In the moving bed system of catalytic cracking, the particles in granular form are contacted with suitably prepared hydrocarbons while gravitating downwardly through a reaction zone in the form of a substantially compact column. The feed stock, such as a gas oil boiling somewhat above the gasoline boiling range, cracks in the presence of the hot catalyst, forming substantial amounts of hydrocarbons which do boil in the gasoline boiling range. Coked or spent catalyst is removed continuously from the bottom of the conversion or reaction zone and transferred to the top of a gravitating substantially compact column of particles in a regeneration zone. The catalyst gravitating through the regeneration or reconditioning zone is contacted with a combustion supporting gas, such as air, to burn off the coke deposits from the surface of the catalyst. The coke-free or regenerated catalyst is withdrawn from the bottom of the column in the regeneration zone and transferred to the top of the column in the reaction zone completing the continuous path.

This process involves the use of high temperatures and may involve the use of high pressures. For example, the reaction zone may be maintained at about 800–1100° F., suitable cracking temperature, and the regeneration zone may be maintained at about 1000–1300° F., suitable regeneration temperature. The catalyst is lifted, therefore, at a temperature of approximately 800–1200° F., or thereabouts.

The catalyst or contact material gravitates as a compact mass in a lift pot to surround the lower end of an upwardly-extending, open-ended lift pipe. A primary gas pipe is projected into the bottom of the lift pot and is terminated just below the lift pipe so as to project lift gas into the lift pipe without passing through any substantial thickness of the catalyst in the lift pot. A secondary lift gas is introduced into the bed of catalyst in the lift pot at locations laterally displaced from the lower end of the lift pipe, so that the secondary gas must pass through a certain thickness of the catalyst bed before entering the lift pipe. By controlling the flow rate of the secondary lift gas, the flow rate of catalyst into and through the lift pipe can be adjusted. If the gas flow to the lift is terminated, the particles in the lift will form a pile or plug at the bottom of the pipe and the lift cannot be restarted in this condition. The catalyst plugging the bottom of the lift pipe must first be physically removed. The circulation of catalyst through the system, however, can be safely stopped by stopping the flow of secondary gas while continuing the flow of primary gas. In this manner the catalyst remaining in the lift pipe is delivered to a separator at the top of the lift pipe.

When the flow of catalyst through the lift is commenced, conditions in the lift are unstable while the flow of catalyst is gradually increased to the desired flow rate. The flow of secondary gas must be increased slowly to build up the catalyst density in the lift. Unfortunately, this requires the full attention of an operator for a considerable period of time. If the secondary gas flow is increased too rapidly the lift develops a surging condition, causing excessive catalyst breakage and frequently ceases to flow, causing a plug of catalyst to form in the lift pipe.

The flow of catalyst through the lift pipe is directly related to the gas pressure in the lift pipe. The gas pressure in the lift pot is normally transferred to a pressure controller, which is set to maintain a certain pressure corresponding to the desired catalyst flow rate. The controller is directly connected to an automatic valve operator to transmit from the controller to the valve operator promptly the required pressure to effect adjustment of a valve in the secondary gas line to keep the pressure in the lift pot substantially constant. I have found that if the flow of gas is diverted from the pressure controller through a throttling station and an accumulating zone before passing to the valve controller, the opening of the secondary valve can be made automatic to gradually increase flow of catalyst through the lift pipe at that rate which will put the lift into operation as promptly as possible without requiring the attention of the lift operator. After the lift has reached the desired flow rate the throttling station and accumulating zone are by-passed so that the controller and valve operator are directly connected for speedy valve response to pressure change in the lift pot and steady catalyst flow is maintained.

The object of this invention is to provide a means and method of automatically starting a pneumatic lift for elevating a granular contact material.

A further object of this invention is to provide a means and method of automatically starting the circulation of contact material in a moving bed hydrocarbon conversion system which utilizes a pneumatic lift for elevation of contact material.

A further object of this invention is to provide for the automatic recommencement of flow of catalyst through a pneumatic lift in a moving bed hydrocarbon cracking system.

These and other objects will be more clearly disclosed in the following detailed description of the invention, which is to be read in conjunction with the attached figures.

Figure 1:
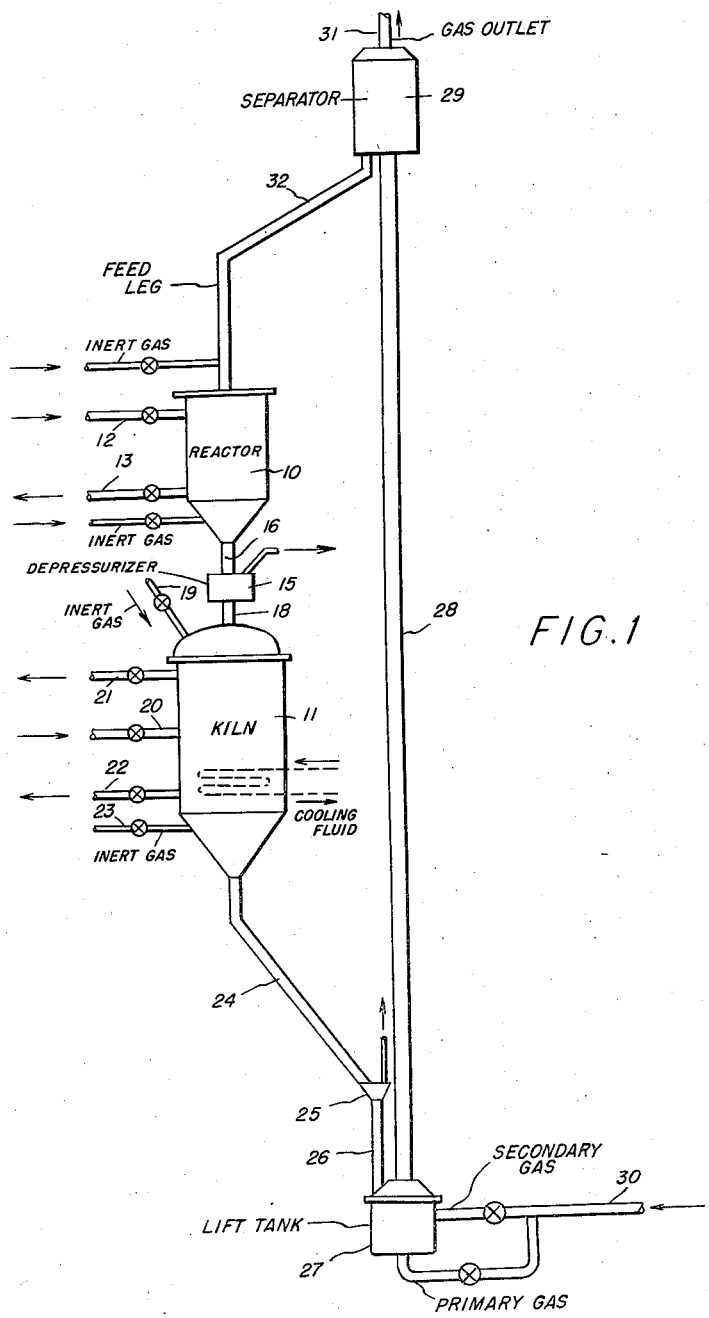
Figure 1 shows a moving bed hydrocarbon conversion system incorporating a gas lift.

Referring now to Figure 1, the reactor 10 is shown superimposed over the kiln or reconditioner 11. Reactant hydrocarbons, in vapor, liquid or mixed form are introduced into the reactor 10 through the conduit 12 and converted products are removed from the vessel through the conduit 13. The particles gravitate downwardly through the vessel as a substantially compact mass, at an elevated temperature, about 800–1100° F., and elevated pressure, about 5–30 p.s.i. (gauge). The particles of contact material are purged in the bottom of the vessel by an inert gas, such as flue gas or steam, introduced through the conduit 14, prior to their withdrawal from the vessel.

The spent or coked catalys particles are introduced into a depressurizer 15 through the conduit 16, where the gas pressure is substantially relieved. The gas is withdrawn from this vessel through the conduit 17 to discharge. The depressurized catalyst is introduced into the top of the kiln 11 through the conduit 18.

Inert gas is introduced into the top of the kiln through the conduit 19 to prevent combustion supporting gases from rising up through the continuous catalyst column. Combustion supporting gas, such as air, is introduced into the vessel 11 through the conduit 20 to travel both upward and downward through the bed while burning the coke deposits on the surface of the particles. The flue gas formed thereby is removed through the conduits 21, 22 to an exhaust stack, not shown. The kiln is generally operated at a low pressure, for example, about 1 p.s.i. (gauge), although much higher pressures can be used. The temperature in the kiln is maintained between about 1000–1300° F. Cooling coils are provided in the vessel for temperature adjustment. Temperatures much above 1300° F. heat damage the catalyst and are to be avoided. When inerts are used as the contact material, however, this limitation does not appy, and materially higher burning temperatures can be used. The particles withdrawn from the kiln are purged by an inert gas introduced through the conduit 23.

The regenerated granular contact material is gravitated through the conduit 24 to a vent chamber 25 where inert gas is removed. The granular particles are then gravitated downwardly through the conduit 26 into the top of the lift tank 27. The lift tank 27 is located at the bottom of the lift pipe 28 and the separator 29 is located at the top. The open-ended lift pipe is terminated intermediate the top and bottom of both vessels. The lower end of the pipe is located far enough below the top of the lift tank so that the granular material introduced into the tank through the conduit 26 forms a substantially compact bed thereabout. Lift gas is introduced through the conduit 30 into the tank in sufficient amount to suspend and lift the particles up the pipe to the separator.

The gas and granular particles are separated in the separator. The gas is discharged through the conduit 31 and the particles are withdrawn in substantially compact-column form through the conduit 32. Inasmuch as there is generally a substantial difference in pressure between the vessels 29 and 10, the feed leg 32 must be sufficiently long to provide a gas seal. A suitable feed leg is shown and claimed in the U.S. Patent No. 2,410,309, which issued October 29, 1946. The problem arises also in connection with feeding the contact material into the lift tank 27 through the conduit 26. A similar feed leg can be utilized at that location.

Figure 2:
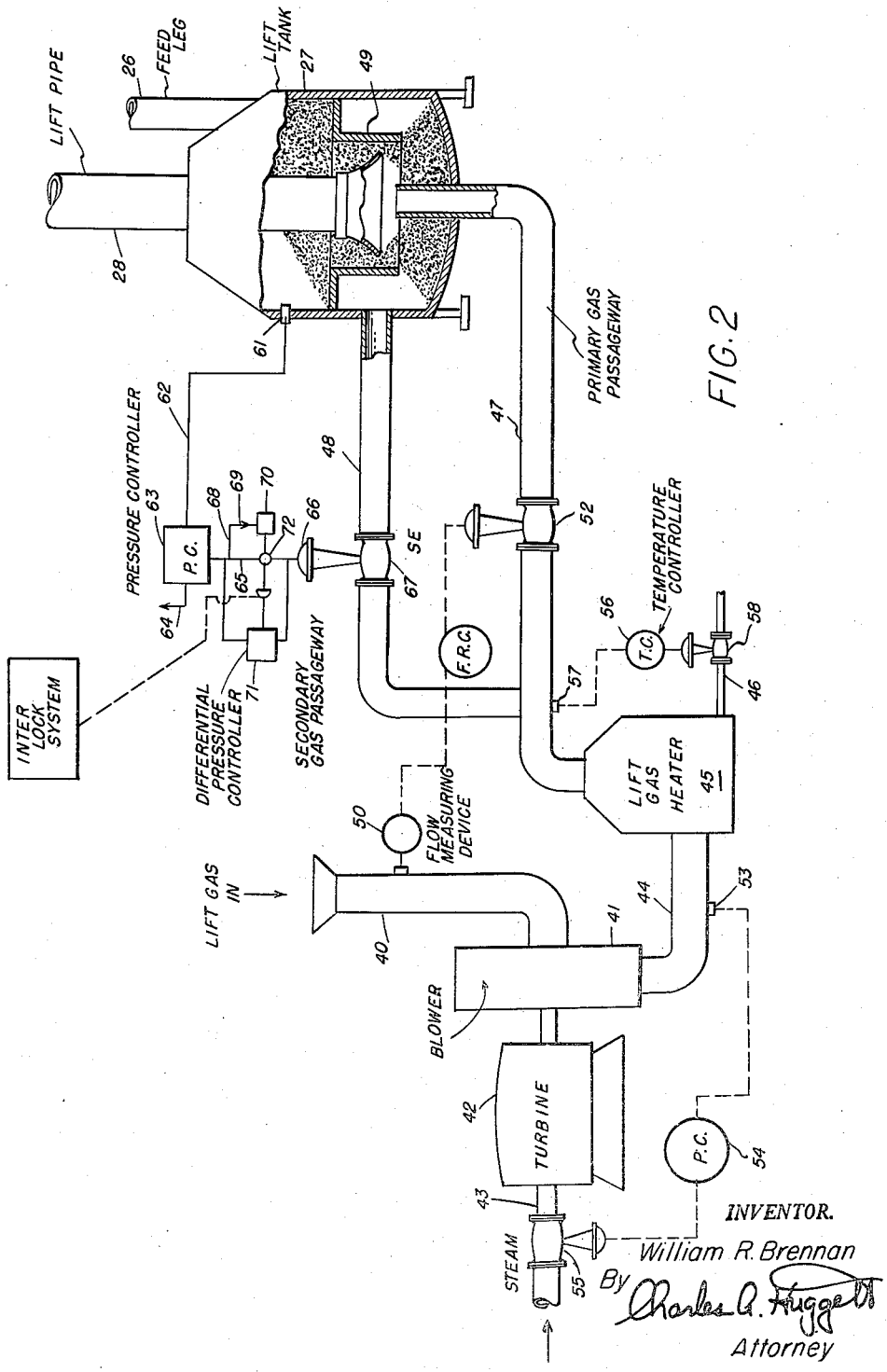
Figure 2 shows a more detailed sketch, partially in section, of the lower portion of the gas lift with the attendant gas introduction apparatus and control devices.

The particular apparatus features of this invention are shown on Figure 2. Lift gas is drawn through the conduit 40 by the blower 41. The blower 41 is driven by the steam turbine 42 to which it is directly connected. The steam is supplied through the conduit 43 and discharged through a drain not shown. The lift gas is discharged from the blower 41 through the conduit 44 to the heater 45. Fuel is supplied to the heater 45 to heat the lift gas to the temperature of the contact material or thereabouts through the conduit 46. The gas discharged from the heater is split into two streams by the primary and secondary gas passageways 47, 48. The lift tank 27 is shown partly in section. The baffle 49 is arranged around the lower end of the lift pipe to provide an annular portion of catalyst bed between the baffle and the lift pipe. The primary gas passageway 47 is terminated in the tank 27 just below the lift pipe 28, so as to permit the gas to pass up the pipe without passing through any substantial thickness of the contact bed. The secondary gas passageway is terminated behind the baffle. The baffle is positioned to direct the secondary gas into the bed at locations substantially displaced from the lower end of the lift pipe, so as to pass through the intervening bed before passing up the pipe. The secondary gas pushes the catalyst in the intervening portion into the primary gas stream where it is suspended and lifted up the pipe.

There is a critical gas flow rate through a pneumatic lift for minimum attrition of the contact material. Below this flow rate the lift goes into a surging condition and catalyst attrition rises sharply. At a gas flow substantially below the critical gas flow the lift will cease to operate and catalyst in the lift pipe will fall to form a solid plug in the bottom of the pipe. Above the critical gas flow rate the attrition rises sharply because of increased collision of particles against particles and metal members in the lift. The critical gas flow rate is found to occur when the pressure drop across the lift is minimum. It is customary, therefore, to maintain the total gas flow rate through the lift pipe at that rate which yields minimum pressure drop across the lift pipe.

In order to maintain the catalyst velocity in the lift within the required range for minimum attrition, a flow measuring device 50 is connected in the conduit 40 on the suction side of blower 41 to develop a signal which actuates the flow rate controller 51 connected to a valve 52 in the primary gas passageway. When the flow measuring device indicates a change in gas flow, the controller operates the valve 52 to return the flow to the desired rate. It has been found that the control is smoother when the pressure of the gas delivered to the heater is maintained substantially constant. A pressure tap 53 in line 44 is connected to the pressure controller 54 which controls valve 55 in the steam line to the turbine. A change in pressure in the conduit 44 causes the controller to readjust the valve 55 which changes the speed of the turbine and blower. The pressure is, therefore, maintained substantially constant.

One of the factors controlling gas velocity in the lift is gas temperature. In order to obtain effective control this should be constant. Hence, a temperature controller 56 is connected to a temperature tap 57 in the stream of gas discharged from the heater and operatively connected to the automatic valve 58 in the fuel line 46. The temperature tap could be located at other places than shown on Figure 2, for example, the top of the lift pipe. The catalyst is delivered to the lift tank at a substantially constant temperature. If the lift gas is delivered to the lift tank at a substantially lower temperature than that of the catalyst, the gas velocity will be increased in the lift pipe because of heat exchange between the hot catalyst and cooler gas. This is avoided by heating the lift gas to a temperature not substantially below that of the hot catalyst, thereby minimizing heat exchange between the lift gas and hot catalyst during transfer through the lift pipe. Since the catalyst is supplied to the lift tank at a substantially constant temperature and the lift gas temperature is maintained substantially constant, variable rates of heat transfer in the lift pipe between the catalyst and lift gas, which would result in variable catalyst discharge velocity from the lift pipe, are avoided.

The catalyst flow rate through the lift pipe and hence through the entire cracking system is directly related to the pressure at the bottom of the lift pipe. This pressure can be conveniently measured in the quiescent region above the level of catalyst in the lift tank 27 by means of the pressure tap 61. This pressure is carried by conduit 62 to a pressure controller 63. This pressure controller is set by the dial 64 to the desired pressure to be maintained in the lift pot, corresponding to the desired catalyst flow rate. The controller transmits through the conduit 65 the required pressure to the valve operator 66 which in turn adjusts the valve 67 in the secondary air line 48 the required amount. The valve 72 is a 3-way valve generally directly connecting pressure controller 63 with the valve operator 66. This valve is connected, however, with an interlock system which is designed to stop the catalyst circulation in the event of an emergency in the system. This valve automatically shifts to disconnect the controller 63 from the valve operator 66 and vent the operator 66 thereby closing the secondary gas valve 67. This stops the flow of catalyst but continues the flow of lift air through the primary gas passageway, thereby clearing the lift pipe 28 of catalyst.

After the difficulty has been removed in the system, the valve 72 is set to connect the pressure controller 63 with the valve operator 66 through a by-pass conduit 68. The valve operator is no longer vented and gas commences to flow from the pressure controller 63 to open the secondary valve 67. A flow-restricting device 69, such as a valve, is located in the conduit 63 and is set to limit rate of gas flow to prevent the operator 66 from opening the valve 67 too rapidly. Conditions in the lift are unstable during recommencement of catalyst flow and too rapid opening of the secondary valve causes surging and flooding of the lift pipe, which causes the lift to shut down and plug. The valve 69 is adjusted so that the valve 67 cannot open rapidly enough to cause this difficulty. It is found that the adjustment of the valve 69 is exceedingly sensitive unless an accumulating zone or tank 70 of substantial gas capacity is located between the valve 69 and the valve operator 66. The accumulator tank 70 is located in the by-pass conduit 68. This accumulator dampens any surge in pressure, causing a steady gradual opening of the secondary valve. When the pressure in the valve operator 66 has finally reached the pressure in the controller 63, the catalyst flow through the lift is up to the desired flow rate. However, because of the valve 69 and accumulator tank 70 the operation of the valve 67 is sluggish and hence the catalyst flow through the lift tends to drift. The differential pressure controller 71 is connected, therefore, between the pressure controller 63 and the valve operator 66 to automatically switch the valve 72 to the normal operating position when the pressure differential is reduced to zero. The pressure controller 63 is then directly connected through conduit 65 with the valve operator 66 so that rapid change of the valve position of valve 67 is effected in response to change in pressure in the lift tank.

Figure 3:
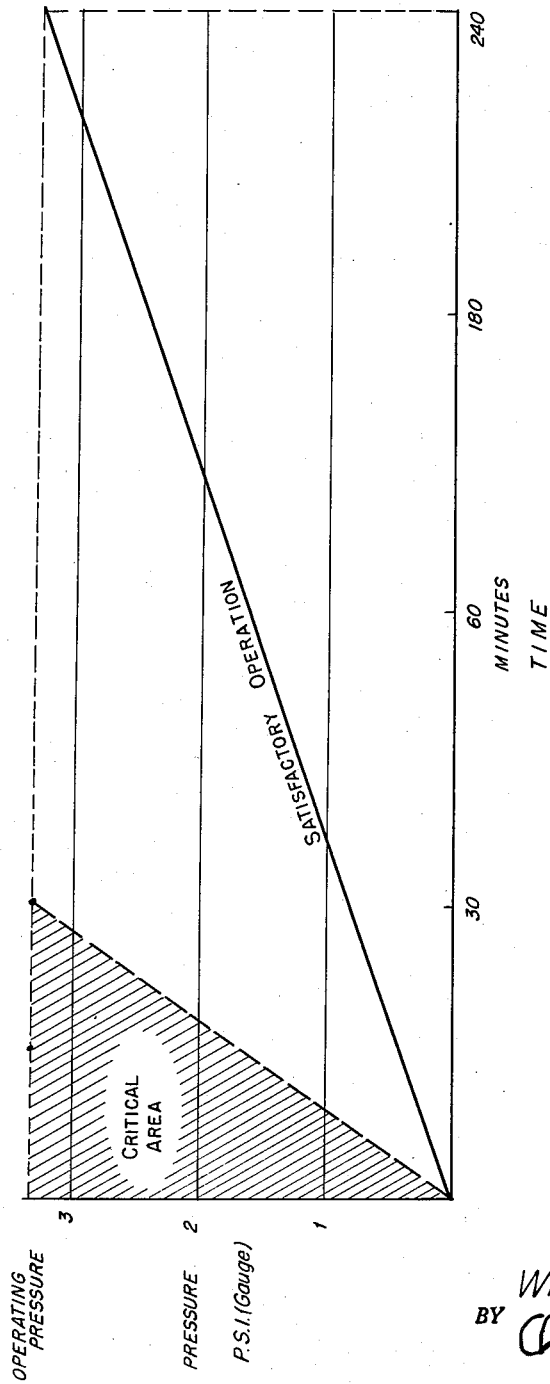
Figure 3 shows a graph of pressure rise in the lift pot of the pneumatic lift versus time for prevention of lift flooding during commencement of catalyst flow.

Referring now to Figure 3, a plot of lift tank pressure versus time for the initial operation of a lift in the customary TCC unit is shown. This may be a 15,000 bbl. per day cracking unit circulating about 400 tons per hour of cracking bead catalyst. If the lift pot is brought up to operating pressure in the critical area, surging occurs and lift operation may fail. It is seen that entirely satisfactory operation is obtained by gradually opening the secondary valve during a two-minute period to reach the pre-set lift pot pressure for steady continuous catalyst flow. The valve 69 and accumulating tank 70 are generally selected to follow the satisfactory operation curve.

*Example 1*

A pneumatic automatic lift starting system for a 15,000 bbl. per day TCC unit having a 220 ft. pneumatic lift designed for elevation of 400 tons/hour of catalyst was arranged in accordance with the showing of Figure 2. The lift pot pressure for 400 tons/hour was 3.2 lbs./sq. in. (gauge) and this pressure was transmitted to a 0–5 p.s.i.g. pressure controller. The controller transmitted over a pressure range of 3–15 p.s.i.g. to a 3–15 p.s.i.g. control valve operator. This operator controlled the position of the secondary valve to maintain the lift pot pressure at 3.2 lbs./sq. in. The valve 69 was set to pass .5 cu. ft. of air/min. and the accumulating tank had a capacity of 1 cu. ft. The valve 72 automatically operated to build up the lift pot pressure in accordance with the satisfactory operation curve as shown on Figure 3 and then transfer to direct connection between the controller and valve operator. The operation was satisfactory in smoothly placing the lift into operation in a minimum of time and without surging or interruption while relieving the operator of the lift for other duties.

This invention has been disclosed in relation to a moving bed TCC system but, of course, it is understood that it has broad application to other systems incorporating a pneumatic lift for elevation of granular contact material. The only limitations intended are found in the attached claims.

I claim:

1. In a pneumatic lift in which a granular contact material is elevated as a dilute phase suspension through an upwardly extending lift passage, the flow rate of the contact material through the lift being controlled by pneumatically controlling the flow rate of a secondary gas stream, adapted to pass through a substantial thickness of a bed of contact material maintained about the bottom of the lift passage, to maintain the pressure in the bed of contact material substantially constant, the improved method of automatically commencing the flow of contact material through the lift which comprises: passing at least the major portion of the lift gas into the lift passage as a primary gas stream, which flows directly into the lift passage without flowing through any substantial thickness of the bed of contact material surrounding the lower end of said lift passage, measuring the gas pressure of the bed of contact material surrounding the lift passage and transmitting a pressure proportional to the measured pressure to a control zone, adjusting the control zone to a desired control pressure, equivalent to the desired rate of flow of contact material through the lift passage, feeding gas from the control zone to a valve-operating zone, in the amount required to adjust the secondary gas flow at the required flow rate to maintain the flow of granular material at the desired flow rate, restricting the flow rate of gas from the control zone to the valve-operating zone below a critical flow rate, passing the flow-restricted gas into a pressure-accumulating zone of substantial volume before supplying said gas to the valve-operating zone, whereby the pressure is built up in the valve-operating zone at a gradually-increasing rate to build up the flow rate of contact material through the lift passage at a retarded rate without causing surging in the lift passage and interruption in flow through the lift passage, measuring the pressure differential between the control zone and the valve-operating zone and by-passing the flow of gas directly from the control zone to the valve-operating zone when said pressure differential has been reduced to substantially zero.

2. In a pneumatic lift in which a granular contact material is elevated as a dilute phase suspension through an upwardly extending lift passageway, the flow rate of the contact material through the lift being controlled by pneumatically controlling the flow rate of a secondary gas stream introduced into a lift tank about the lower end of the lift passageway to pass through a substantial thickness of a bed of contact material maintained within the lift tank about the bottom of the lift passage, so as to maintain the pressure in the lift tank substantially constant, the improved apparatus combination adapted for automatic commencement of the flow of contact material through the lift passageway which comprises: a primary lift pipe projected into the lower end of the lift tank and terminated beneath the lift passageway, a secondary lift pipe connected to said lift tank, adapted to feed lift gas into the mass of contact material surrounding the lower end of said lift passageway, a valve located in said secondary lift pipe, a valve operator connected with said valve, a valve controller, a pressure conduit connecting said lift tank and said controller, means for setting said controller to a predetermined control pressure, first conduit means connecting said controller and valve operator, adapted to transfer gas under pressure from said controller to said operator, so as to operate said valve in said secondary pipe, second conduit means for transferring gas under pressure from said controller to said valve operator, flow restricting means in said second conduit means, to limit the pressure build up in said valve operator, an accumulating tank in said second conduit means between said flow restricting means and said valve operator, a pressure differential controller between said valve operator and said valve controller, operatively connected to flow diverting means, whereby flow of gas from said valve controller to said valve operator is automatically diverted from said second conduit means to said first conduit means on reduction of pressure between said valve controller and said valve operator to a predetermined minimum pressure, whereby said lift is placed in operation automatically without refluxing and flow interruption.

No references cited.